United States Patent [19]
Sander

[11] Patent Number: 4,861,214
[45] Date of Patent: Aug. 29, 1989

[54] APPARATUS FOR CONVEYING COUNTERWEIGHTS AND RETAINING SPRINGS FROM STORAGE MAGAZINES TO INSERTION HEADS OF A WHEEL BALANCING INSTALLATION

[75] Inventor: Rembrandt Sander, Darmstadt, Fed. Rep. of Germany

[73] Assignee: Gebr. Hofmann GmbH & Co. KG, Pfungstadt, Fed. Rep. of Germany

[21] Appl. No.: 82,622

[22] Filed: Aug. 7, 1987

[30] Foreign Application Priority Data

Aug. 8, 1986 [DE] Fed. Rep. of Germany ....... 3626911

[51] Int. Cl.⁴ .............................................. B65G 1/04
[52] U.S. Cl. .................................... 414/225; 414/222; 414/224; 414/331; 414/736; 414/751; 414/266; 29/809; 73/487
[58] Field of Search ............... 414/223, 222, 224, 225, 414/730, 226, 680, 331, 266, 736, 751, 267, 126, 729, 749, 128; 73/66, 487, 225, 824; 29/792, 771, 823, 809, 810, 822; 221/10

[56] References Cited

U.S. PATENT DOCUMENTS

| | | | |
|---|---|---|---|
| 2,662,646 | 12/1953 | McCain | 29/809 X |
| 3,239,079 | 3/1966 | Leavesley, Jr. et al. | 414/224 X |
| 3,670,387 | 6/1972 | Nagao | 29/809 X |
| 3,748,910 | 7/1973 | Hofmann | 73/487 X |
| 4,302,144 | 11/1981 | Hallqvist | 414/225 X |
| 4,575,299 | 3/1986 | Layton et al. | 414/222 |
| 4,653,185 | 3/1987 | Kajima et al. | 29/809 |
| 4,718,533 | 1/1988 | Nussbaumer et al. | 414/222 X |

FOREIGN PATENT DOCUMENTS 863716 3/1961 United Kingdom ................. 29/809

Primary Examiner—Frank E. Werner
Attorney, Agent, or Firm—Fleit, Jacobson, Cohn, Price, Holman & Stern

[57] ABSTRACT

Apparatus for conveying counterweights and retaining springs from magazines and a spring supply device to insertion heads of a wheel balancing installation includes a single transfer unit that simultaneously conveys retaining springs and counterweights from the respective magazines and insertion device to the insertion heads along a rigid rectilinear guide. The transfer unit has pockets with releasable clamps for the counterweights and springs. The clamps are controlled by a reciprocatory cam assembly outside of the transfer unit.

11 Claims, 4 Drawing Sheets

APPARATUS FOR CONVEYING COUNTERWEIGHTS AND RETAINING SPRINGS FROM STORAGE MAGAZINES TO INSERTION HEADS OF A WHEEL BALANCING INSTALLATION

FIELD OF THE INVENTION

This invention relates to apparatus for conveying counterweights and retaining springs from counterweight storage magazines and a spring supply device respectively to insertion heads of a wheel balancing installation, more particularly, an automatic wheel balancing installation.

BACKGROUND OF THE INVENTION

In known apparatus of the above kind, the conveyance of counterweights from respective storage magazines to the insertion heads, by means of which the counterweights are placed on a wheel to be balanced, is effected by separate feed and conveying lines. Compressed air hoses leading from the individual magazine containers, for different counterweight sizes, to the insertion heads, are used as routes of conveyance for the counterweights. An oscillating conveyor comprising an aligning rail, in which the retaining springs are conveyed to the spring holding means in the insertion heads individually, is used for conveying the retaining springs. Since a corresponding number of magazines is provided for the various sizes of counterweights, and since separate compressed air hoses, through which the counterweights are conveyed to the insertion heads from the magazines are used, a large number of individual conveyance lines is required for the counterweights. Moreover, the retaining springs are conveyed into the insertion heads by conveyance lines provided separately from the counterweight conveyance lines. In this way, coordination of weights and pertinent springs may be achieved by an appropriate control system, but a well defined positioning during the transfer, particularly of the counterweights, is not possible. For this reason, jamming and rise drifts may occur during movement of the counterweights.

SUMMARY OF THE INVENTION

It is an object of the invention to provide apparatus of the kind described in which counterweights as well as retaining springs are moved from the respective storage magazines to the insertion heads by way of a common supply line.

In accordance with the invention, a single transfer unit is provided by means of which both the counterweights as well as the retaining springs are supplied to the insertion heads simultaneously. Preferably, two counterweight receivers and two retaining spring receivers are provided in the transfer unit. The two counterweights and the two retaining springs, delivered from respective storage magazines and spring supply device, are moved to two insertion heads for the two balancing planes in which equalization of a tire imbalance takes place. The balancing heads may be constructed in a known manner and operate in such a way that they retain, in each balancing plane, the compensating weight, in each case on the tire rim, and that, by sliding on the respective retaining spring, the weight is fastened to the rim at the site where equalization of the imbalance is to be effected.

Inasmuch as a single transfer unit is used which receives from the respective magazines the appropriate weights and the coordinated retaining springs, a compact space-saving apparatus is provided, in which a rapid supply of counterweights and retaining springs to the inserting heads is effected. The counterweights can be supplied to the insertion heads in precise positioning, so that jamming and rise drifts are prevented. Moreover, an improved compensation of manufacturing tolerances, which cannot altogether be avoided, of counterweights and springs is achieved.

Preferably, the transfer unit is mounted so that it may be slid as well as rotated in relationship to the magazines, in such a way that the two receivers for the counterweights and retaining springs may be mounted facing the corresponding magazine and supply device openings. To this end, the transfer unit may be slidably mounted on a rigid rectilinear guide rod. The guide rod may be designed in such a way that the transfer unit rotates around it, but, in a preferred embodiment of the invention, the guide rod may be rotated and the transfer unit may be mounted thereon in a slidable non-rotary manner. Thus, the guide rod may have a square cross section and be passed through an appropriate central aperture of the transfer unit.

The receivers for the counterweights and retaining springs are located on the exterior of the transfer unit and preferably are positioned diametrically opposite one another in relation to the axis of rotation of the unit. The receptacles may be designed, in suitable manner, to serve as holding devices for the counterweights and retaining springs. Magnetic or mechanical means may be used for holding the springs and counterweights in place.

Preferably, the transfer unit may be formed as a clamping chuck for the counterweights and retaining springs, while the receiving devices may be formed as storage pockets which include releasable clamping devices for the counterweights and springs. Advantageously, the clamping devices may be controlled from outside the transfer unit, in such a way that counterweights and retaining springs will be arranged, following their delivery from the appropriate magazines and spring supply device, with precise positioning in the transfer unit.

It is possible to provide positioning devices for accurately locating the springs and weights in the respective pockets, such devices being, for example, in the form of positioning rods which engage corresponding recesses or apertures in the counterweights and/or the springs. However, it is also possible to develop the clamping means in an appropriate manner.

The controlled clamping means ensure, in addition, that, when the counterweights and retaining springs are delivered to the insertion head, release will take place at the right moment for delivery. The invention may be used, preferably, in a balancing fixture for the balancing of automobile tires, the fixture operating automatically.

DESCRIPTION OF PREFERRED EMBODIMENT

Figure 1:
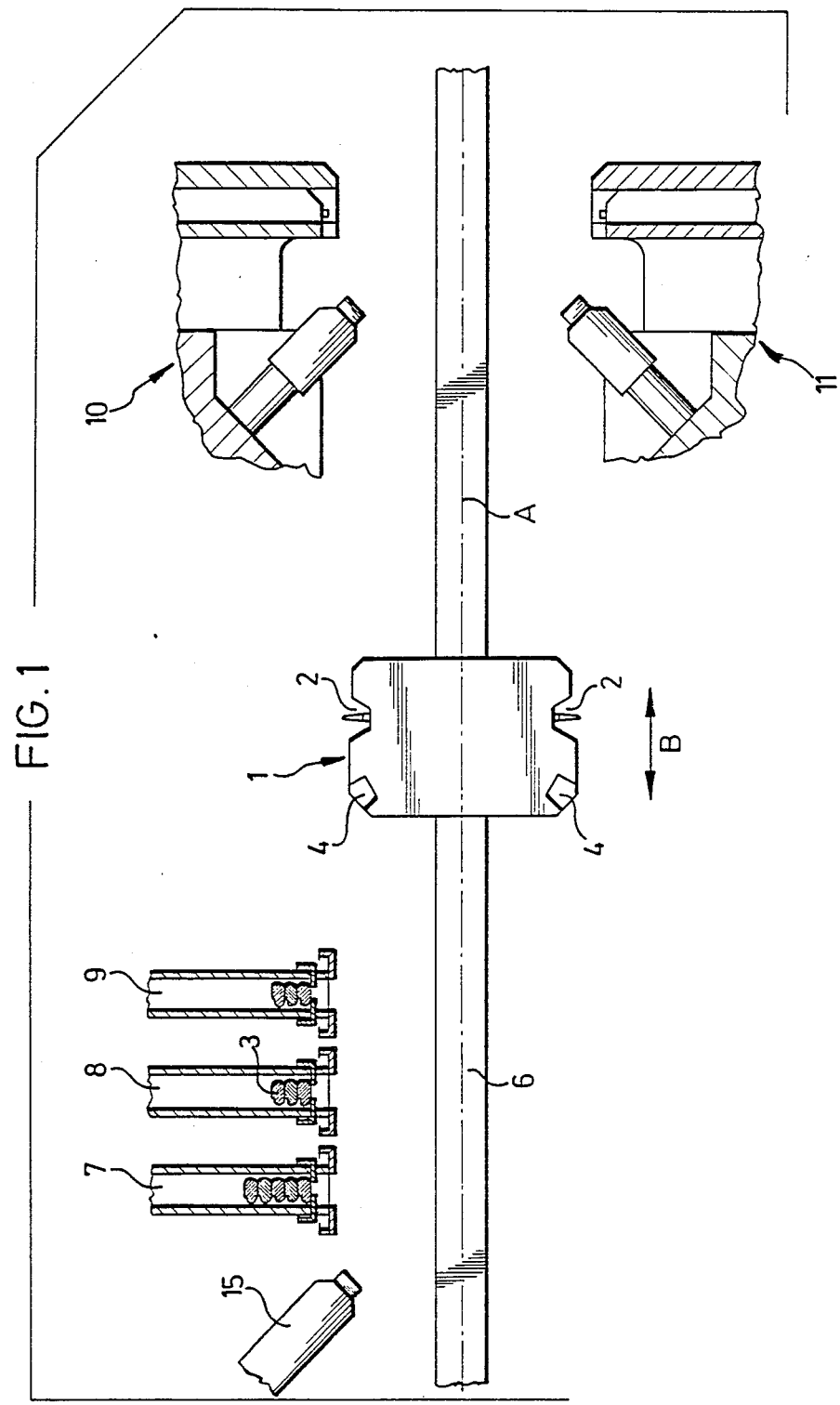
FIG. 1 is a somewhat diagrammatic side elevational view of apparatus in accordance with the invention for delivering counterweights and retaining springs from storage magazines and a spring supply device to insertion heads of a wheel balancing installation.

The apparatus shown in FIG. 1 comprises a transfer unit 1 formed, as will later be described in more detail, as a clamping chuck. The transfer unit may be moved in the direction of a double arrow B between magazines 7, 8, 9, in which various counterweights 3 are stored in respective stacks and insertion heads 10 and 11 of an automatic wheel balancing installation. In the example shown, a guide rod 6, preferably of square cross section, is used as a rectilinear rigid guide for moving the transfer unit 1 back and forth between the magazines and the insertion heads. The transfer unit is mounted on the guide rod in a torsion-resistant manner movable back and forth in the directions of arrow B. A spring supply device 15 for storing and supplying retaining springs 5 is provided adjacent the magazines 7, 8, 9, which latter are arranged in a row.

The transfer unit 1 comprises two receiving pockets 2, each for a counterweight 3, and two receiving pockets 4, each for a retaining spring 5. In order that the receiving pockets 2 and 4 may each be provided with a counterweight and a retaining spring, respectively, the transfer unit 1, together with guide rod 6, may be rotated about longitudinal axis A of the rod through 180°, in such a way that the receiving pockets 2 and 4 can be positioned adjacent the pertinent magazines 7, 8 or 9, and the spring supply device 15.

Figure 2:
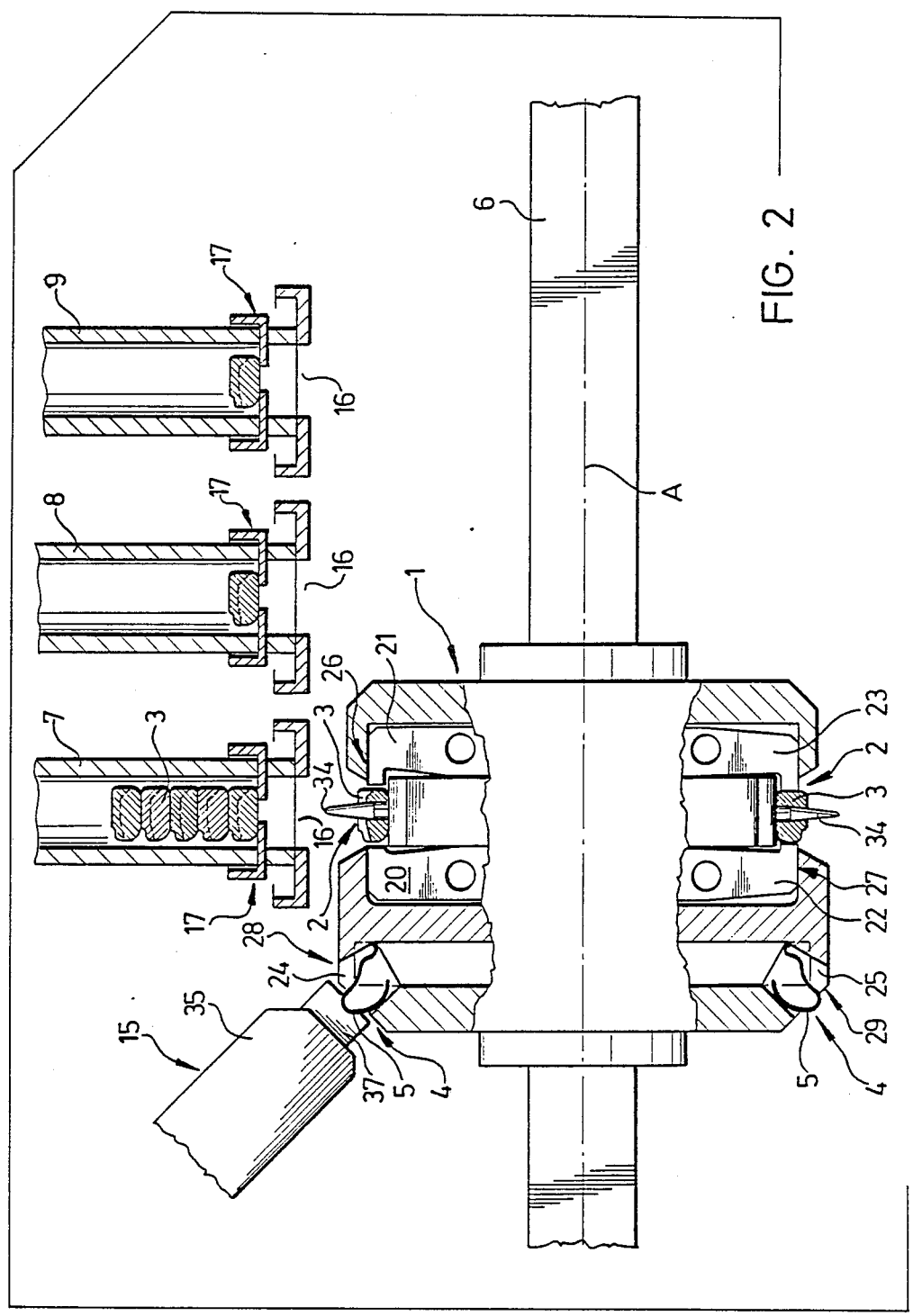
FIG. 2 is an enlarged view, partly in section, of part of the apparatus showing a transfer unit positioned at a spring and counterweight receiving location.

FIG. 2 shows the position of the transfer unit 1 below the row of magazines. In a first transfer step, the counterweight 3 and retaining spring 5 at the bottom of FIG. 2 have already been transferred, respectively, from one of the magazines 7, 8, 9 and the spring supply device 15 to the transfer unit. Following this transfer, the counterweight 3 has been clamped with the aid of a clamping means 27 comprising clamping jaws 22 and 23. Similarly, the bottom spring 5 has been clamped with the aid of a clamping means 29 comprising a clamping jaw 25, whereby the respective counterweight and spring are firmly clamped in the respective receiving pockets 2 and 4. The transfer unit has been rotated about axis A by 180° into the position shown in FIG. 2, and the counterweight 3 at the top of the transfer unit has just been supplied from the pertinent magazine by gravity into the receiving pocket 2 therebelow. The retaining spring 5 at the top of the transfer unit has also been supplied to the topmost receiving device 4. When the top counterweight 3 and retaining spring 5 are in the respective receiving pockets 2 and 4, a clamping device 26 with clamping jaws 20 and 21 for clamping the counterweight 3 in place, and a clamping device 28 with a clamping jaw 24 for clamping the retaining spring 5 in place are actuated.

In order that only a single weight falls each time from the respective magazine 7, 8 or 9, through a downwardly directed opening 16, each of the magazines has a separating means 17, of known form, on its lower opening 16. Counterweights of different weight and sizes may be located in the respective magazines 7, 8 and 9, each magazine being assigned a certain counterweight size. In the example shown, the transfer unit 1 is capable of receiving two counterweights 3 and two coordinated retainer springs 5. Each counterweight is destined for a balancing plane on a wheel to be balanced. By rotating the guide rod 6, it is possible to position the respective receiving device 2 below the bottom opening 16 of the pertinent magazine so that the appropriate counterweight will be transferred to the transfer unit. For the supply of a spring from the spring supply device 15, the transfer unit, in FIG. 2, is moved to the left, if the weight was withdrawn from magazine 8 or 9, so that the receiving device 4 is positioned opposite the spring supply device 15. If the counterweights are received from magazine 7, no movement of the transfer unit 1 is required for delivery of a spring. The spring supply device 15 essentially consists of a magnet 34 which accepts one retaining spring at a time from an oscillating conveyor, not shown in detail, and in which the springs are kept in readiness and placed into the correct position. With the aid of a holder 35, the magnet is moved to-and-fro between the oscillating conveyor and the transfer position shown in FIG. 2.

It may also be seen in FIG. 2 that a positioning and locating means 34 is provided in the receiving pockets 2 for the counterweights. In the example shown, the positioning and locating means 34 consists of two positioning rods, which are mounted at a distance, vertically to the plane of the drawing. The distance is equal to the distance between recess openings in the counterweights 3. During the transfer of each counterweight, the transfer unit is positioned below the lower opening of the pertinent magazine 7, 8 or 9, in such a way that the positioning rods are aligned with recesses in the counterweights. When a counterweight 3 falls from its respective magazine, it is precisely positioned in the pertinent receiving pocket 2 by the two positioning rods 34. After the counterweight has been retained by means of the clamping devices 26 or 27, respectively, in the receiving pocket, and after the inserted retaining spring 5 has been retained by the clamping means 24 or 25, the transfer unit can be rotated around axis A so that the diametrically opposed receiving pockets will be turned to face upwardly for receipt of a counterweight and spring. When both counterweights 3 and both coordinated retaining springs 5 are positioned correctly and clamped in place in the transfer unit 1, the transfer unit is moved along or by the guide rod 6 to the insertion heads 10 and 11, by any appropriate drive mechanism well known per se, until the transfer unit assumes the position shown in FIG. 3 between the respective insertion heads 10 and 11 which are coordinated with the pertinent balancing planes. In that position, the counterweights 3 and the retaining springs are released by the clamping means, so that their takeover by the insertion heads 10 and 11 may take place.

Figure 3:
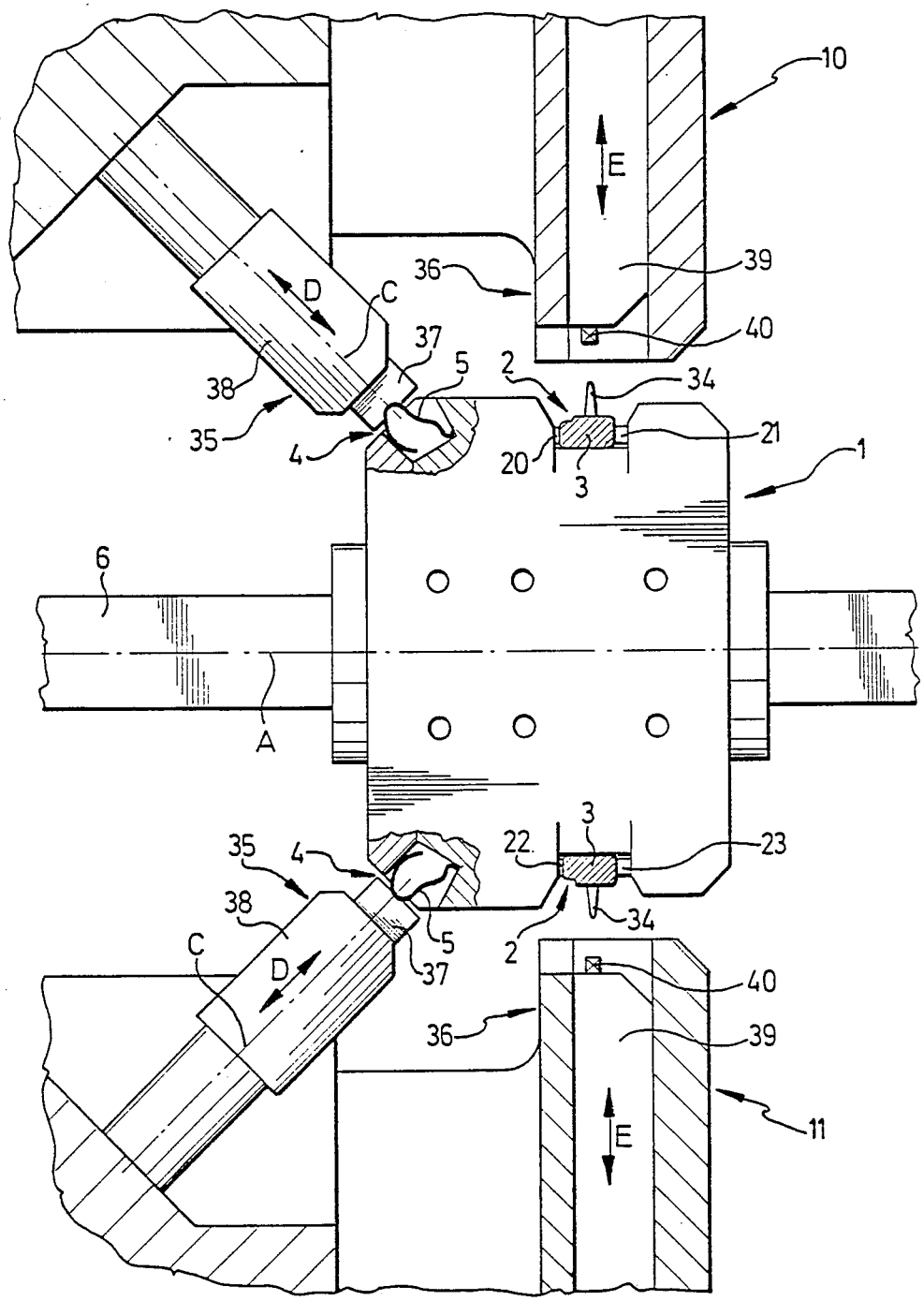
FIG. 3 is an elevational view of part of the apparatus showing the transfer unit positioned for delivery of springs and counterweights to the insertion heads.

As shown in FIG. 3, each insertion head 10 and 11 comprises a means 35 for inserting the spring and a means 36 for inserting the weight. Each means 35 comprises a retaining magnet 37 which may be moved to-and-fro by means of a guide device 38, along an axis C in the direction of double arrow D, for the withdrawal of the retaining spring 5, which has been released by the clamping means, and for inserting movement during the fastening of the counterweight onto a wheel to be balanced.

The means 36 for inserting the weight comprises a holding device 39, which may be moved to-and-fro in a guideway, in the direction of double arrow E, and gripping members 40, e.g., pliers, by means of which the counterweights 3 which are released by the clamping jaws 22 and 23 or 20 and 21, respectively, can be removed from the receiving pockets 2 of the transfer unit. Such removal is effected by retracting the holding device 39 out of the transfer unit 1 while the weights are held in the correct position for their insertion into the corresponding balancing plane of the wheel to be balanced, in the insertion head 10 or 11, respectively. The gripping members 40 may, at the same time, be inserted, for example, into the recesses of the counterweights 3, through which the positioning rods 34 project, for positionally correct holding of the weights. It is also possible for the counterweights 3 to be seized laterally by means of appropriate gripping members. Since the positioning rods 34 of the transfer unit 1 assume a definite position in relation to the pertinent holder 39 or to the pertinent gripping members 40 in the insertion head 10 or 11, respectively, during each supply movement, a positionally correct transfer of the counterweights as well as of the coordinated retaining springs from the magazine side of the apparatus to the weight insertion side of the balancing installation is achieved. The transfer of the retaining springs 5 and the counterweights 3 takes place along a single transfer line, with the aid of a single transfer tool in the form of the transfer unit 1, which is preferably designed as a clamping chuck.

The insertion heads 10 and 11 may have a floating bearing, so that irregularities of the wheels to be balanced, particularly of the rims, may be compensated. The compensation of the imbalance takes place sequentially while, in each case, the angular position is adjusted for the counterweight to be inserted in each plane. Moreover, the insertion heads 10 and 11 are capable of executing an additional horizontal movement for the means 36, so as to be able to pull the counterweight into the radius of the flange when the wheel flanges are considerably rolled.

Figure 4:
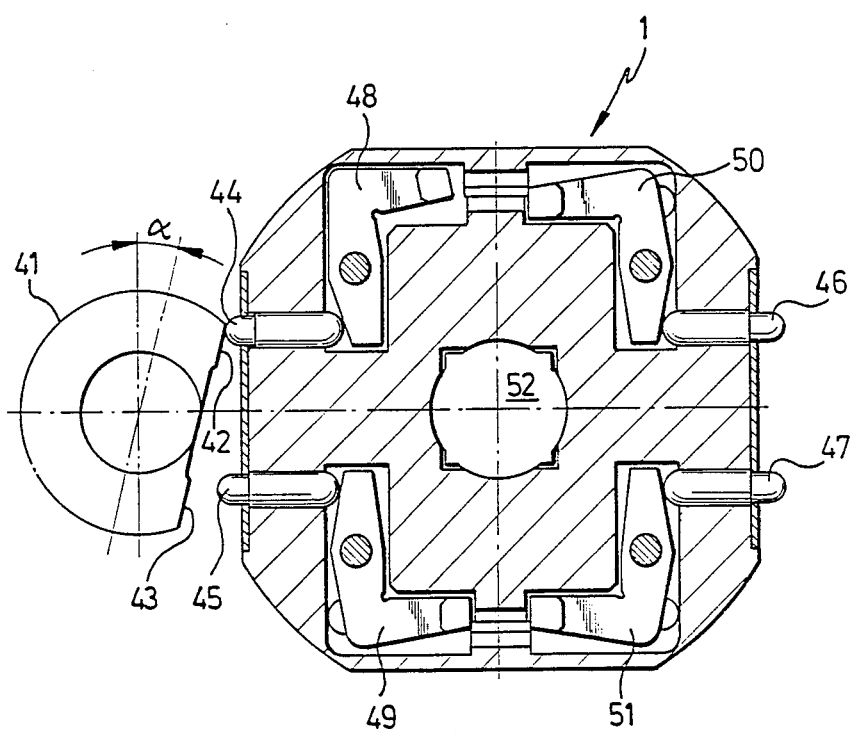
FIG. 4 is a sectional end elevational view through the transfer unit and showing a control mechanism for use therewith.

FIG. 4 shows a control device for actuating the clamping means 26, 27 for the counterweights 3 and the clamping means 28, 29 for the retaining springs. The control device consists essentially of a control rod 41 which extends parallel to the guide rod 6 and may be rotated to-and-fro within an angle of rotation α. The control rod which is flattened on one side adjacent the transfer unit, to provide a form of cam, comprises detents 42 and 43 which interact with actuating pistons 44 to 47 on the transfer unit. Depending on the direction in which the control rod 41 is rotated within the angle of rotation α, one of the adjacent actuating pins (in FIG. 4 actuating pin 44) is inserted into the transfer unit 1, to operate a respective one of a plurality of transfer levers 48 to 51 operatively connected with the respective clamping means. Thus, in FIG. 4, the transfer lever 48 is swung against the force of the pin, not shown in detail, thereby opening the pertinent clamping means, so that the appropriate retaining spring and/or the pertinent counterweight 3 may be inserted, on the side of the magazines into the transfer unit 1 and/or removed from the transfer unit 1 on the side of the insertion heads. The control rod 41 extends parallel to the guide rod 6 which passes through a central aperture 52 of the transfer unit. The pins 46 and 47 are actuated in the same manner when the transfer unit is rotated about the axis of rod 6. After counterweights and retaining springs have been delivered to the insertion heads, the transfer unit and the guide device are moved back and the wheel to be balanced is moved between the insertion heads.

What is claimed is:

1. Apparatus for transferring counterweights and retaining springs from storage magazines and a spring supply device respectively to spring and counterweight insertion means of a wheel balancing installation comprising a transfer unit having external receiving means for counterweights and further external receiving means for retaining springs adjacent the receiving means for counterweights, a rigid rectilinear guide on which the transfer unit is mounted for movement between the magazines and the insertion heads, the guide and transfer device being mutually configured for selectively positioning the transfer unit in selected stationary positions adjacent respective ones of the magazines and spring supply device on one hand and adjacent the insertion means on the other hand in such a way that for withdrawal of a counterweight from a respective magazine, the receiving means for the counterweights may be aligned with a magazine opening corresponding to a required counterweight and that the receiving means for the retaining springs may be aligned with the spring supply device, and that for inserting of the counterweight and spring, the receiving means for the counterweights and springs may be aligned with the respective counterweight and spring insertion means.

2. Apparatus in accordance with claim 1 wherein the receiving means for counterweights comprises a pair of oppositely disposed receiving devices for respective counterweights and the receiving means for the springs comprises a pair of oppositely disposed receiving devices for respective springs.

3. Apparatus in accordance with claim 2 wherein the transfer device is mounted for rotation about a longitudinal axis of the guide for presenting the respective receiving devices to the magazines and spring supply device.

4. Apparatus in accordance with claim 1 wherein the transfer unit is in the form of a chuck including receiving pockets defining the respective receiving means and releasable clamping means associated with the respective pockets.

5. Apparatus in accordance with claim 4 including control means for the clamping means located externally of the transfer unit.

6. Apparatus in accordance with claim 4 wherein each clamping means comprises a spring loaded clamping jaw and an operating pin for moving the jaw, the pin protruding from the transfer unit for operation by the control means.

7. Apparatus as defined in claim 6 wherein the control means comprises a reciprocal pin-contacting cam means.

8. Apparatus in accordance with claim 1 wherein the receiving means for counterweights includes a counterweight positioning and locating means.

9. Apparatus as defined in claim 8 wherein the positioning and locating means comprises upstanding post means for engaging corresponding aperture means in a counterweight.

10. Apparatus as defined in claim 1 wherein the guide is in the form of a steering rod.

11. Apparatus as defined in claim 10 wherein the steering rod is mounted for rotation about its longitudinal axis and the transfer unit is slidably mounted in a torsion-resistant manner on the steering rod.

* * * * *